United States Patent Office 3,444,052
Patented May 13, 1969

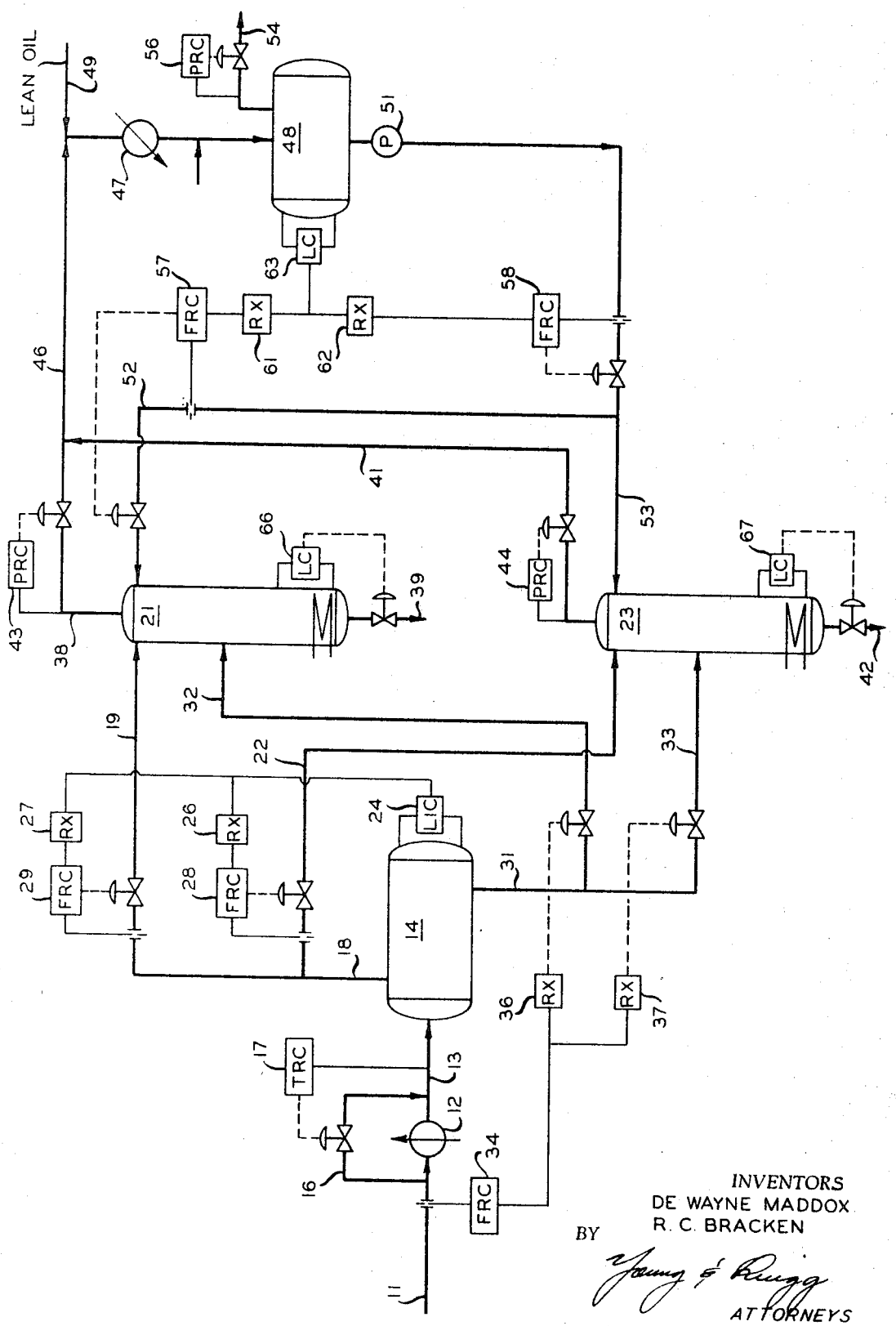

3,444,052
FLASH VAPORIZATION WITH VAPOR FLOW STREAMS CONTROLLED BY LIQUID LEVEL
Robert C. Bracken and De Wayne Maddox, Bartlesville, Okla., assignors to Phillips Petroleum Company, a corporation of Delaware
Filed Dec. 11, 1967, Ser. No. 689,548
Int. Cl. B01d *3/42*
U.S. Cl. 203—1            4 Claims

ABSTRACT OF THE DISCLOSURE

Flash vapor flow is controlled in response to the liquid level in the flash zone and flash liquid flow is controlled in response to flow of feed to the flash zone.

---

This invention relates to flow control. In another aspect, it relates to a method and apparatus for control of flow of flash vapor and liquid from a flash zone. In another aspect, this invention relates to a method and apparatus for control of flow of flash vapor and liquid from a flash zone to one or more distillation zones. In another aspect, this invention relates to apparatus for separation and control of liquid containing vaporizable components.

There are many operations in which it is necessary or desirable to flash a liquid containing some vaporizable components and thereby separate vaporized portions from unvaporized portions. In some instances, it is desirable to control the flow of the vapor and liquid portions from the flash zone.

An object of the invention is to control the flow of flash vapor and liquid from a flash zone. Another object of the invention is to control the flow of flashed vapor and liquid from a flash zone through a plurality of conduits to a plurality of fractional distillation zones.

Other aspects, objects and the advantages of our invention are apparent in the written description, the drawing and the claims.

When a liquid is flashed in a flash tank, it is difficult to control the rate of flow of flash liquid because the liquid tends to flash further when passing through a flow measuring device, thus causing irregular and inaccurate flow measurements.

When rich oil is flashed in a common flash tank and the flashed rich oil divided and passed to two fractional distillation columns as feed, it has been found difficult to provide the desired rate of flow of feed to each column due to the continued flashing of the rich oil through the flow measuring device.

By the practice of this invention, flow of flashed liquid is controlled without actually measuring its flow.

According to the invention, a likuid containing vaporizable components is fed to a flash zone, the flow of flashed vapor from the flash zone is controlled in response to liquid level in the flash zone and the flow of flashed liquid in the flash zone is controlled in response to the flow of feed to the flash zone. Further according to the invention, vaporizable components are separated from a liquid containing them by passing the liquid containing the vaporizable components to a flash zone, dividing the flow of flashed vapor therefrom, controlling each divided stream thereof in response to liquid level in the flash zone, dividing the flow of flashed liquid therefrom and controlling each divided stream thereof in response to flow of fluid into the flash zone. Further according to the invention, rich absorber oil is separated by passing it into a flash zone, dividing the flow of flashed vapor therefrom into at least two streams which are fed separately to indiivdual fractional distillation zones, separating the flow of flashed liquid from the flash zone into the same number of separate streams which are fed individually to the fractional distillation zones, controlling the flow of each stream of flashed vapor in response to liquid level in the flash zone and controlling the flow of each stream of flashed liquid in response to the flow of rich oil into the flash zone.

Further according to the invention, there is provided apparatus comprising a flash chamber, means to remove flashed vapor therefrom, and means to control the flow of the flashed vapor in response to the liquid level therein, and means to remove flashed liquid therefrom together with means to control the flow of the flashed liquid in response to the rate of flow of fluid to the flash chamber. Further according to the invention, there are provided means to divide the flashed vapor into at least two separate flow streams, and the means for controlling the flow of the flashed vapor includes flow control means for each of the divided streams, a biasing relay for each of the control means and a liquid level control connected to these two biasing relays, and means are provided to divide the flow of flashed liquid into at least two flow streams, flow control means are provided for each of the separate streams and biasing relays for each of the control means, the biasing relays being connected with means to measure flow of fluid into the flash chamber.

In the drawing, rich oil from an absorber is passed through line 11, heat exchanger 12, and line 13 into flash chamber 14. A portion of the rich oil from line 11 is by-passed around heat exchanger 12 through line 16. A temperature recorder controller 17 controls the flow through line 16 in response to the temperature in line 13 to maintain the desired temperature of the feed inlet to flash chamber 14. Flashed vapor from chamber 14 is removed through line 18. A portion of this vapor is passed through line 19 to demethanizer 21, a fractional distillation column. The remainder of the flashed vapors are passed through line 22 to demethanizer 23, also a fractional distillation column. A liquid level indicator controller 24 transmits a signal into biasing relays 26 and 27. Biasing relay 26 controls the set point of flow recorder controller 28 which controls the flow in line 22 by means of valve 28A while biasing relay 27 controls the set point of flow recorder controller 29 which controls the flow in line 19 by means of valve 29A.

Flashed liquid is removed from flash chamber 14 through line 31. A portion of the flashed liquid flows through line 32 to demethanizer 21 while the remainder flows through line 33 to demethanizer 23. A flow recorder controller 34 transmits the signal to biasing relays 36 and 37 which regulate valves 36A and 37A as shown to control flow in lines 32 and 33, respectively.

Pressure recorder-controllers 43 and 44 are provided on vapor outlets 38 and 41 to control valves 38A and 41A, respectively, of demethanizers 21 and 23, and bottoms product are removed through lines 39 and 42 through valves 39A and 42A, respectively.

Products removed through outlets 38 and 41 are combined and passed through line 46 and condenser 47 to accumulator 48. Additonal lean oil is added through pipe 49 as desired. Liquid from accumulator 48 is pumped by pump 51 through lines 52 and 53 as reflux for demethanizers 21 and 23, respectively. Vapor is removed from accumulator 48 through pipe 54. Pressure recorder controller 56 is provided in pipe 54 to operate valve 56A to control the pressure of accumulator 48. The flow of reflux to demethanizers 21 and 23 is controlled by flow recorder controllers 57 and 58 which operate valves 57A and 58A, respectively. The set point of controllers 57 and 58 is adjusted by biasing relays 61 and 62 in response to liquid level controller 63 on accumulator 48. Liquid withdrawal from demethanizers 21 and 23 is controlled by liquid level controllers 66 and 67 which operate valves 39A and 42A, respectively.

In the operation of the system as described, the biasing relays 26, 27, 36 and 37 are set to provide the desired division of flow between the demethanizers 21 and 23 as determined by the operation of the demethanizers. The control system then maintains the desired division.

EXAMPLE

In an example according to the invention, flash chamber 14 is operated at 40° F. and 535 p.s.i.g. Demethanizers 21 and 23 are operated with a top temperature of −19° F., a kettle temperature of 275° F. and a pressure of 500 p.s.i.g. (498 p.s.i.g. at the top). Accumulator 48 is operated at 483 p.s.i.g. and −35° F. The reflux in lines 52 and 53 is at −35° F. and 501 p.s.i.g.

In operation, a rich oil is fed in line 11 at a rate of 5400 gallons per minute (g.p.m.) at −35° F. Temperature recorder controller 17 is set to control the flow in line 16 to maintain the temperature of the feed inlet to flash chamber 14 in line 13 at 40° F. The liquid fraction from flash chamber 14 is divided into equal parts and fed to demethanizers 21 and 23 through lines 32 and 33, 2399 g.p.m. and 1,906,000 standard cubic feet per day (s.c.f.d.) of vapor being fed to each demethanizer. The vapor fraction from flash chamber 14 is divided into equal parts and fed through lines 19 and 20, each demethanizer receiving 22,047 s.c.f.d.

The kettle product from demethanizers 21 and 23 is provided at 275° F. in the amount of 2795 g.p.m. from each column. The vapor product from pipe 54 is produced at −35° F. in amounts to 78,627,000 s.c.f.d. The liquid fraction from accumulator 48 is divided into equal parts and fed through pipes 52 and 53 to fractionators 21 and 23 as reflux, 707 g.p.m. at −35° F. going to each column.

The composition of the rich oil feed, the liquid fraction and vapor fraction being fed to each demethanizer from flash chamber 14, the vapor product in pipe 54 and the kettle product from each demethanizer are given in the table in mols per day and mol percent.

controlling the flow of the flashed liquid in the third conduit in response to a measurement of liquid flow in the first conduit wherein:
  the flow of flashed vapor from the flash zone is divided to pass into a first plurality of conduits;
  the flow of flashed vapor is controlled in each of the first plurality of conduits in response to the measurement of liquid level;
  the flow of flashed liquid is divided into a second plurality of conduits and the flow of flashed liquid in each of the second plurality of conduits is controlled in response to the flow of liquid in the first conduit;
  the flow through each conduit of said first plurality of conduits is fed to a separate fractional distillation column; and
  the flow through each conduit of the second plurality of conduits is fed to a separate one of said fractional distillation columns.

2. The method of claim 1 wherein the liquid containing vaporizable components is a rich absorber oil.

3. Apparatus for separating vaporizable components from a liquid containing them comprising:
  a flash chamber;
  a first conduit connected to a first fractional distillation column to remove flashed vapor from said chamber;
  first flow control means in said first conduit;
  liquid level measurement means to measure the liquid level in said chamber and produce a liquid level signal;
  means to regulate the first flow controller means in response to the liquid level signal;
  a second conduit connected to said first fractional distillation column to remove flashed liquid from said chamber;
  second flow control means in said second conduit;
  third conduit to feed a liquid containing vaporizable components into said chamber;
  means to measure the flow in said third conduit and produce a flow signal;
  means to adjust the second flow regulating means in response to the flow signal;

TABLE

|  | Rich Oil Feed | | Liquid Fraction | | Vapor Fraction | | Kettle Product | | Vapor Product | |
|---|---|---|---|---|---|---|---|---|---|---|
|  | Mols/day | Mol percent | Mols/day | Mol percent | Mols/day | Mol percent | Mols/day | Mol percent | Mols/day | Mol percent |
| $CO_2$ | 15,060 | 2.5 | 6,412 | 2.7 | 1,118 | 1.9 | 6,240 | 2.6 | 2,580 | 1.2 |
| $N_2$ | 187 | Trace | 18 | Trace | 75 | .1 | 0 |  | 187 | .1 |
| $C_1$ | 200,603 | 33.6 | 49,354 | 20.5 | 50,947 | 88.1 | 725 | .3 | 199,153 | 96.5 |
| $C_2$ | 62,831 | 10.5 | 26,354 | 10.9 | 5,062 | 8.8 | 29,130 | 12.2 | 4,570 | 2.2 |
| $C_3$ | 19,411 | 3.3 | 9,158 | 3.8 | 546 | 1.0 | 9,705 | 4.0 |  |  |
| $C_4$ | 5,785 | 1.0 | 2,826 | 1.2 | 67 | .1 | 2,893 | 1.2 |  |  |
| $C_5$ | 1,711 | .3 | 848 | .4 | 7 | Trace | 858 | .4 |  |  |
| $C_6$ | 1,304 | .2 | 651 | .3 | 1 |  | 647 | .3 | 10 | Trace |
| $C_7$ | 948 | .2 | 473 | .2 | 1 |  | 473 | .2 |  |  |
| $C_8$ and $C_8+$ | 288,909 | 48.4 | 144,366 | 60.0 | 88 |  | 187,748 | 78.8 |  |  |
|  | 596,749 | 100.0 | 240,461 | 100.0 | 57,913 |  | 238,417 | 100.0 | 206,500 | 100.0 |

Reasonable variation and modification are possible within the scope of the invention which sets forth method and apparatus for controlling flow of flash vapor and liquid from a flash zone.

We claim:

1. A method for controlling the flow of effluent from a flash zone comprising the steps of:
  passing a liquid containing vaporizable components to a flash zone to a first conduit;
  removing flashed vapor from the flash zone to a second conduit;
  removing flashed liquid from the flash zone through a third conduit;
  controlling the flow of the flashed vapor in the second conduit in response to a measurement of liquid level in the flash zone; and at least one additional vapor conduit connected to a second fractional distillation column and having third flow control means, the first and third control means being regulated in response to the liquid level control;
  at least one additional liquid flow control connected to said fractional distillation column and having fourth flow control means, said second and fourth flow control means being regulated in response to the measurement of flow in the third conduit.

4. The apparatus of claim 3 including a first biasing relay to modify the response of said first flow control means, a second biasing relay to modify the response of said second flow control means, a third biasing relay to modify the response of said third flow control means, and a fourth biasing relay to modify the response of said fourth flow control means.

References Cited

UNITED STATES PATENTS

| | | | |
|---|---|---|---|
| 2,754,246 | 7/1956 | Brosamer | 208—354 |
| 2,900,213 | 8/1959 | Gilmore | 202—160 |
| 3,058,893 | 10/1962 | Cahn et al. | 208—354 |
| 3,130,027 | 4/1964 | Harper | 62—21 |
| 3,148,966 | 9/1964 | Kitchen | 62—21 |
| 3,296,097 | 1/1967 | Lupfer | 203—2 |
| 3,356,590 | 12/1967 | Johnson | 203—2 |

OTHER REFERENCES

Parkins: "Continuous Distillation Plant Controls"—Chemical Engineering Process (vol. 5, No. 7, July 1959), pp. 60–68.

WILBUR L. BASCOMB, JR., *Primary Examiner.*

U.S. Cl. X.R.

62—21; 196—132; 202—154, 160, 181; 203—2, 74, 75, 77, 78, 80, 88; 208—352, 354, 361, 357